(12) United States Patent
Attebery, II

(10) Patent No.: US 11,391,048 B2
(45) Date of Patent: Jul. 19, 2022

(54) PANELIZED LATH AND DRAINAGE PLANE SYSTEM FOR BUILDING EXTERIORS

(71) Applicant: Harold C. Attebery, II, Tarpon Springs, FL (US)

(72) Inventor: Harold C. Attebery, II, Tarpon Springs, FL (US)

(73) Assignee: Mechanically Attached Stone Systems LLC, Granville, OH (US)

( * ) Notice: Subject to any disclaimer, the term of this patent is extended or adjusted under 35 U.S.C. 154(b) by 0 days.

(21) Appl. No.: 16/870,827

(22) Filed: May 8, 2020

(65) Prior Publication Data

US 2020/0354965 A1 Nov. 12, 2020

Related U.S. Application Data

(60) Provisional application No. 62/844,895, filed on May 8, 2019.

(51) Int. Cl.
*E04F 13/04* (2006.01)
*B32B 3/30* (2006.01)
(Continued)

(52) U.S. Cl.
CPC ............ *E04F 13/047* (2013.01); *B32B 3/266* (2013.01); *B32B 3/30* (2013.01); *B32B 13/12* (2013.01);
(Continued)

(58) Field of Classification Search
CPC ... E04F 13/047; E04F 2203/065; E04F 13/04; E04B 1/7038; E04B 2/845
(Continued)

(56) References Cited

U.S. PATENT DOCUMENTS 1,767,565 A * 6/1930 Thrift ...................... F16B 15/02
411/475
1,782,568 A * 11/1930 Hicks ...................... E04F 13/04
52/445
(Continued)

FOREIGN PATENT DOCUMENTS

DE 19507041 A1 * 9/1996 ........... E04B 1/7069
EP 2789765 A1 * 10/2014 ............. C04B 28/02
(Continued)

OTHER PUBLICATIONS

Translation of JP 2018066264 A obtained from https://worldwide.espacenet.com/ at address: http://translationportal.epo.org/emtp/translate/?ACTION=description-retrieval&COUNTRY=.*
(Continued)

*Primary Examiner* — Brian D Mattei
*Assistant Examiner* — Joseph J. Sadlon
(74) *Attorney, Agent, or Firm* — The Richards Law Firm LLC; William B. Richards, Esq.

(57) ABSTRACT

A panelized lath and drainage plane panel and system is disclosed. A panel comprises a patterned polymer board providing a continuous drainage plane and a metallic lath affixed to the patterned polymer board, such that a first pair of adjacent edges include an exposed surface of the patterned polymer board. The panel may also include a second pair of adjacent edges, opposite the first pair of adjacent edges include an overhang of metallic lath. The system provides an open-air space between the exterior of the structure and the polymer board to allow the egress of liquid water and water vapor. A wall system using such panels is also disclosed. Typically, a manmade or natural stone veneer or a stucco is applied over the system.

9 Claims, 22 Drawing Sheets

(51) Int. Cl.
  *B32B 3/26*   (2006.01)
  *B32B 13/12*  (2006.01)
  *E04B 2/84*   (2006.01)
  *E04B 1/70*   (2006.01)

(52) U.S. Cl.
  CPC ............ *E04B 1/7038* (2013.01); *E04B 2/845* (2013.01); *B32B 2607/00* (2013.01)

(58) Field of Classification Search
  USPC ...................................................... 52/302.1
  See application file for complete search history.

(56) References Cited

U.S. PATENT DOCUMENTS

| | | | | |
|---|---|---|---|---|
| 1,802,779 A * | 4/1931 | Quade | ................. | E04F 13/04 52/446 |
| 2,212,126 A * | 8/1940 | Phillips | ................. | E04F 13/045 52/363 |
| 2,477,381 A * | 7/1949 | Lewis | ................. | E04B 2/845 52/275 |
| 3,015,194 A * | 1/1962 | Clark | ................. | E04F 13/045 52/378 |
| 3,318,056 A * | 5/1967 | Thompson | ................. | E04B 2/709 52/603 |
| 3,498,015 A * | 3/1970 | Green | ................. | E04D 7/00 52/310 |
| 3,982,368 A * | 9/1976 | Perrin | ................. | E04B 2/842 52/381 |
| 4,114,335 A * | 9/1978 | Carroll | ................. | E04D 13/1606 52/302.1 |
| 4,507,901 A * | 4/1985 | Carroll | ................. | E04B 7/00 52/220.1 |
| 4,571,914 A * | 2/1986 | Stoyanoff | ................. | E04B 2/842 52/671 |
| 4,637,184 A * | 1/1987 | Radtke | ................. | E04F 15/123 52/302.1 |
| 4,943,185 A * | 7/1990 | McGuckin | ................. | E02B 11/00 210/170.07 |
| 4,970,838 A * | 11/1990 | Phillips | ................. | E04B 1/04 52/250 |
| 5,224,316 A * | 7/1993 | Fredericks | ................. | E04F 13/04 52/309.7 |
| 5,350,554 A * | 9/1994 | Miller | ................. | B28B 23/0006 425/102 |
| 5,598,673 A | 2/1997 | Atkins | | |
| 5,625,986 A * | 5/1997 | Mansfield | ................. | E04F 13/068 52/351 |
| 6,098,367 A * | 8/2000 | Fridman | ................. | E04B 2/58 52/645 |
| 6,233,890 B1 * | 5/2001 | Tonyan | ................. | E04F 13/06 52/302.1 |
| 6,408,585 B1 * | 6/2002 | Tajima | ................. | E04F 13/0862 52/506.08 |
| 6,990,775 B2 * | 1/2006 | Koester | ................. | E04B 1/70 428/121 |
| 7,367,165 B2 * | 5/2008 | Hatzinikolas | ................. | E04B 1/7046 52/302.1 |
| 7,617,638 B1 * | 11/2009 | Slama | ................. | E04B 2/707 52/198 |
| 7,625,827 B2 * | 12/2009 | Egan | ................. | E04C 2/26 52/220.1 |
| 7,836,660 B2 * | 11/2010 | Gharibeh | ................. | E04B 5/026 52/364 |
| 7,963,080 B1 * | 6/2011 | Bowman | ................. | B32B 13/00 52/414 |
| 8,734,932 B2 | 5/2014 | Keene | | |
| 8,769,894 B2 * | 7/2014 | Power | ................. | E04B 1/70 52/302.3 |
| 8,888,067 B1 * | 11/2014 | Calmes | ................. | B28B 19/0061 249/15 |
| 9,016,018 B2 * | 4/2015 | Boyle | ................. | E04F 15/182 52/749.11 |
| 9,097,006 B2 | 8/2015 | Johnson | | |
| 9,145,688 B2 | 9/2015 | Hunt-Hansen | | |
| 9,562,359 B1 * | 2/2017 | Grisolia | ................. | B32B 3/085 52/302.1 |
| 9,677,270 B2 * | 6/2017 | Serino | ................. | B32B 37/14 |
| 9,840,851 B2 * | 12/2017 | Propst | ................. | E04B 7/22 |
| 9,856,642 B2 * | 1/2018 | Ukrainetz | ................. | E04B 1/7076 |
| 10,011,990 B2 | 7/2018 | Collins | | |
| 10,233,637 B2 * | 3/2019 | Barr | ................. | B32B 5/024 |
| 10,273,639 B2 * | 4/2019 | Penland, Jr. | ................. | E04B 1/7076 |
| 10,316,527 B2 | 6/2019 | Keene | | |
| 10,590,660 B2 | 3/2020 | Keene | | |
| 10,676,918 B2 * | 6/2020 | Caruso | ................. | B32B 27/14 |
| 10,683,619 B2 * | 6/2020 | Tsimmerman | ................. | B32B 13/02 |
| 10,689,851 B2 * | 6/2020 | Rapone | ................. | E04B 1/64 |
| 10,767,369 B2 * | 9/2020 | Ekster | ................. | B32B 5/028 |
| 10,914,082 B2 * | 2/2021 | St. Germain | ................. | B32B 9/00 |
| 2001/0023565 A1 * | 9/2001 | Snider | ................. | E02D 31/06 52/302.1 |
| 2006/0201092 A1 * | 9/2006 | Saathoff | ................. | E04F 13/047 52/385 |
| 2007/0094964 A1 * | 5/2007 | Stender | ................. | F24F 5/0075 52/302.1 |
| 2007/0125024 A1 * | 6/2007 | Ponzo | ................. | F24B 1/198 52/364 |
| 2008/0016802 A1 * | 1/2008 | Rheaume | ................. | E04C 2/26 52/220.1 |
| 2009/0031656 A1 * | 2/2009 | Hunt-Hansen | ................. | E04F 13/047 52/746.1 |
| 2010/0043311 A1 * | 2/2010 | Chich | ................. | E04D 13/152 52/302.1 |
| 2010/0287864 A1 * | 11/2010 | Hatzinikolas | ................. | E04B 1/70 52/302.1 |
| 2011/0173909 A1 * | 7/2011 | Viau | ................. | E04F 13/0825 52/302.1 |
| 2012/0297711 A1 * | 11/2012 | Ehrman | ................. | B32B 3/085 52/302.1 |
| 2013/0097956 A1 * | 4/2013 | Francavilla | ................. | E04B 2/845 52/424 |
| 2014/0260034 A1 * | 9/2014 | Ciuperca | ................. | E04C 5/125 52/405.3 |
| 2016/0265220 A1 * | 9/2016 | Johnson | ................. | E04B 1/665 |
| 2017/0218635 A1 * | 8/2017 | O'Leary | ................. | B32B 27/06 |

FOREIGN PATENT DOCUMENTS

| | | | | |
|---|---|---|---|---|
| FR | 2918688 A1 * | 1/2009 | ............ | E04B 1/762 |
| JP | 2007182677 A * | 7/2007 | | |
| JP | 2018066264 A * | 4/2018 | | |
| WO | WO-2012170104 A2 * | 12/2012 | ............ | E04B 1/7069 |

OTHER PUBLICATIONS

JP&ENGINE=google&FORMAT=docdb&KIND=A&LOCALE=en_EP&NUMBER=2018066264&OPS=ops.epo. (Year: 2021).*
Combined translation for JP 2007182677 A granted to Mori et al. (Jul. 19, 2007) retrieved Feb. 9, 2022 and titled "6870827_Bibliographic_data_JP2007182677A_2007-07-19_DESCRIPTION_CLAIMS_orig.pdf" (Year: 2022).*
Brochure for DELTA®-DRY & LATH by Dörken Systems Inc., 4655 Delta Way, Beamsville, ON L0R 1B4, CA.
Mortar Net Solutions, LathNet System, Retrieved from WayBackMachine, dated Apr. 18, 2016, last viewed May 8, 2022.

* cited by examiner

PANELIZED LATH AND DRAINAGE PLANE SYSTEM FOR BUILDING EXTERIORS

CROSS-REFERENCES TO RELATED APPLICATIONS

This application claims priority to U.S. Prov. Pat. App. No. 62/844,895, filed May 8, 2019, entitled, "Panelized Lath and Drainage Plane System for Building Exteriors", currently pending, which application is incorporated herein by reference.

FIELD

This description relates to panelized lath and drainage plane panels and systems for building exteriors for use on the wall of a structure.

BACKGROUND

A number of building exteriors include exterior finishes such as stucco and affixed manufactured or natural stone, which have become common in the building industry. Typically, a metal lath is attached to a building exterior as the support for a cementitious mortar, which fully encapsulates the lath. The mortar is applied as an undercoat, or "scratch" coat, which provides a solid foundation for a stucco finish layer or a stone veneer. While these exteriors provide a rugged exterior surface, there have been substantial incidences of water damage behind these surfaces. A number of states in the United States, and countries such as Canada, are beginning to use building codes that require a drainage plane behind the exterior surface to allow water drainage and a vapor path to inhibit the formation of rot, mold, and mildew. Construction firms have found it difficult to meet these building codes in an economical manner.

SUMMARY

Various embodiments of the present invention provide an exterior system for providing a drainage plane between the decorative counterflashing and the structural wall with panels of a panelized lath and patterned polymer board on the exterior wall and with the lath being affixed to the patterned polymer board such that one pair of edges of the lath overhang a corresponding pair of edges of the patterned polymer board. The overhanging edges of lath overlap the adjacent lath panels to form a rugged exterior wall. A drainage plane is defined by the hollows created by the patterned polymer board to allow liquid water to flow between the raised sections and the structural wall and a cementitious layer applied to the panels. The patterned polymer board may also overhang the lath such that the overhanging edges of the patterned polymer board are covered by the patterned polymer board of subsequently applied panels to form a continuous barrier. Alternatively, one pair of edges of the patterned polymer board are aligned with the corresponding pair of edges of the lath such that on the wall the edges of the polymer board abut to form a continuous barrier. The raised sections on the polymer board may form continuous vertical channels or discontinuous raised sections to allow a continuous flow around the raised sections.

In one exemplary embodiment, a building exterior system provides a drainage plane between a decorative counterflashing and a structural wall. There is an exterior structural wall to which a plurality of panels of panelized lath and patterned polymer board are attached. The patterned polymer board has a base and a face defined by raised sections which define continuous hollows beneath the raised sections. The board is generally rectangular with pairs of opposed edges and the lath panel is generally rectangular with pairs of opposed edges. The lath is affixed to the patterned polymer board such that one pair of edges of the patterned polymer board is offset from a corresponding pair of edges of the lath. The drainage plane is defined by the hollows created by the patterned polymer board to allow liquid water to flow between the raised sections and the structural wall. A cementitious layer is applied to the panels to substantially coat the lath and at least partially fill the face of the patterned polymer board.

In a further exemplary embodiment, a panelized lath and drainage plane panel is provided for building exteriors. The panel comprises a generally rectangular lath panel having pairs of opposed edges and a generally rectangular patterned polymer board affixed to the lath. The board comprises pairs of opposed edges and a base and a face defined by raised sections defining continuous hollows beneath the raised sections. The patterned polymer board is arranged on the lath such that one pair of edges of the patterned polymer board overhang a corresponding pair of edges of the lath and the lath is arranged on the patterned polymer board such that one pair of edges of the lath overhang a corresponding pair of edges of the patterned polymer board.

In a further embodiment, a panelized lath and drainage plane panel is provided for building exteriors. The panel comprises a generally rectangular lath panel having pairs of opposed edges and a generally rectangular patterned polymer board affixed to the lath. The board comprises pairs of opposed edges and a base and a face defined by raised sections defining continuous hollows beneath the raised sections. The patterned polymer board is arranged on the lath such that one pair of edges of the patterned polymer board align with a corresponding pair of edges of the lath and one pair of edges of the lath overhang a corresponding pair of edges of the patterned polymer board.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings. The drawings are incorporated in, and constitute a part of, this specification, illustrate several embodiments consistent with the invention and, together with the description, serve to explain the principles of the invention.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figure 1A:
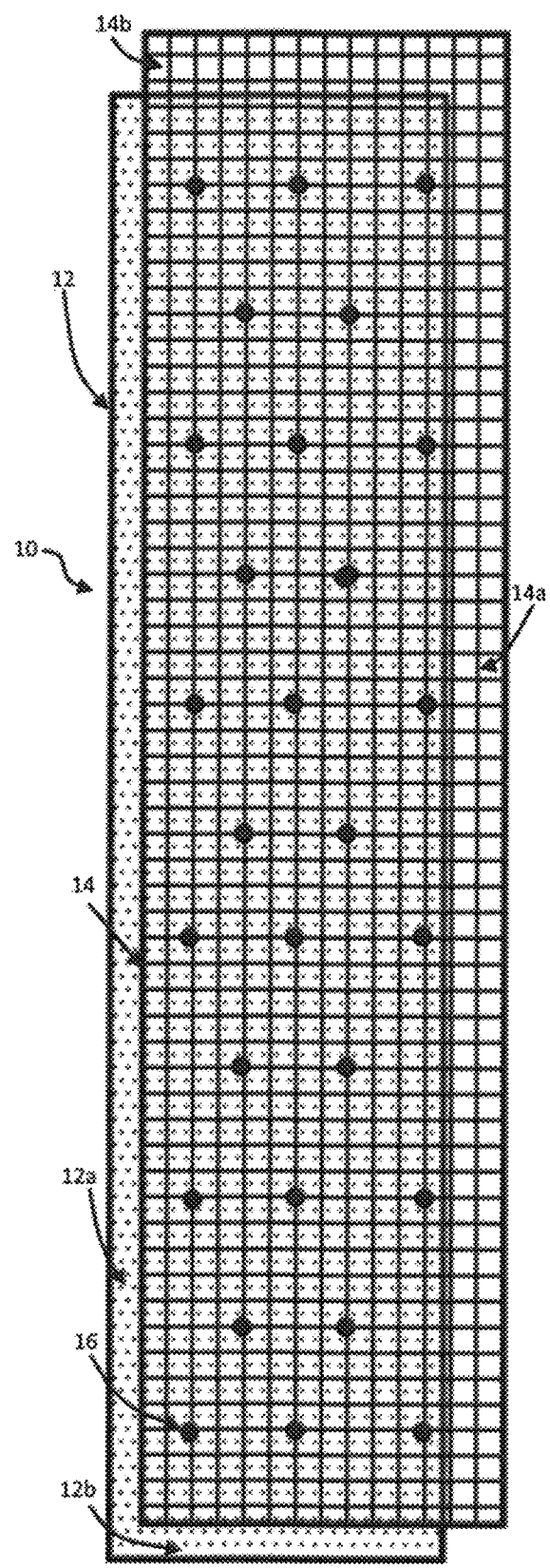
FIG. 1A illustrates a top view of a single panel of a panelized lath and drainage plane system for building exteriors in accordance with an embodiment of the present invention.

As shown in FIG. 1A, a single panel 10 of a panelized lath and drainage plane system for building exteriors typically includes a patterned polymer board 12 with a lath panel 14 affixed thereto. While the affixation of the lath 14 to the polymer board 12 may be referred to as affixed, as will be appreciated by those skilled in the art, and as discussed further herein, other satisfactory methods of affixation are quite acceptable. In FIG. 1A, the polymer board pattern shown is a dimpled pattern 12. The lath and drainage plane panel 10 and system shown in FIG. 1A-FIG. 1C includes a patterned polymer board 12 such as DELTA®-DRY (available from Dörken Systems Inc.), Drain-N-Dry™ (from Boral), or Dri-Drain (available from DriAG Systems). The polymer board 12 is preferably mounted to a metal lath 14 such as a galvanized expanded steel sheet which is widely available in 2.5 pound per square yard or 3.4 pound per square yard diamond lath. The shape of polymer board 12 may vary but provides an open-air space (drainage plane 13) between the exterior of the structure 20 (as seen in FIG. 1C) and the polymer board 12 to allow the egress of liquid water and water vapor. Metal lath 14 is formed from sheet steel, or other acceptable material, that has been slit and expanded to form a large number of "keys" per square yard to provide strength and flexibility such that a rugged surface is formed when a cementitious layer is applied over and surrounding the lath 14. The cementitious layer may also fill portions of the patterned polymer board 12. In the United States, lath 14 is typically sold in 27 in.×8 ft. sheets or 28 in.×8 ft. sheets. As shown in FIG. 1A, one embodiment of the invention provides an offset between the lath 14 and the patterned polymer board 12 such that adjacent edges 12*a*, 12*b* are exposed (lath shifted down and right in FIG. 1A). The offset provides an exposed surface 12*a* at the top of polymer board 12 and an exposed surface 12*b* along an adjacent side such that the patterns on adjacent sheets may be mated on a wall to inhibit the ingress of liquid water. The lath 14 being offset provides exposed edges 14*a*, 14*b* to allow the lath to overlap lath 14 of an adjacent panel 10. The overlapping lath 14 delivers a stronger and more resilient cementitious layer and inhibits the formation of "storyline" cracks at the edges of each sheet of lath 14. The length of the lath overlap is typically 1-2" and may be defined by local building code. Once the cementitious layer has cured, a decorative layer such as stucco or a stone fascia may be applied.

Figure 1B:
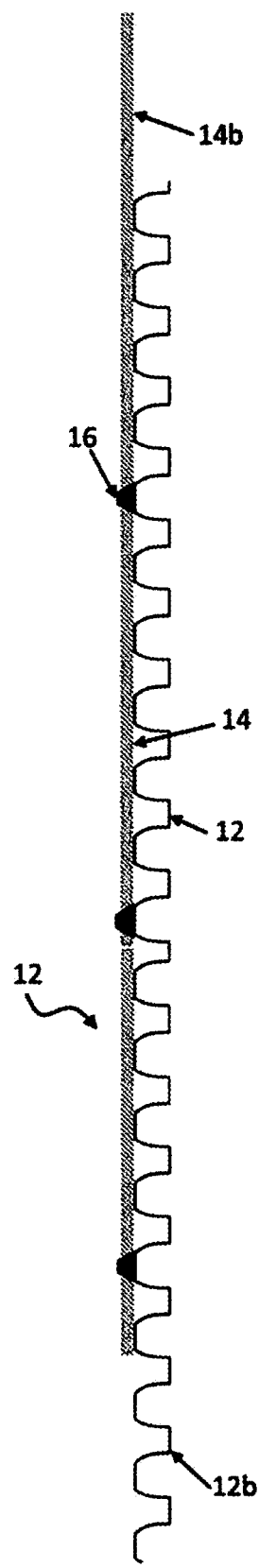
FIG. 1B illustrates a side view of a single panel of a panelized lath and drainage plane system for building exteriors in accordance with an embodiment of the present invention.
Figure 1C:
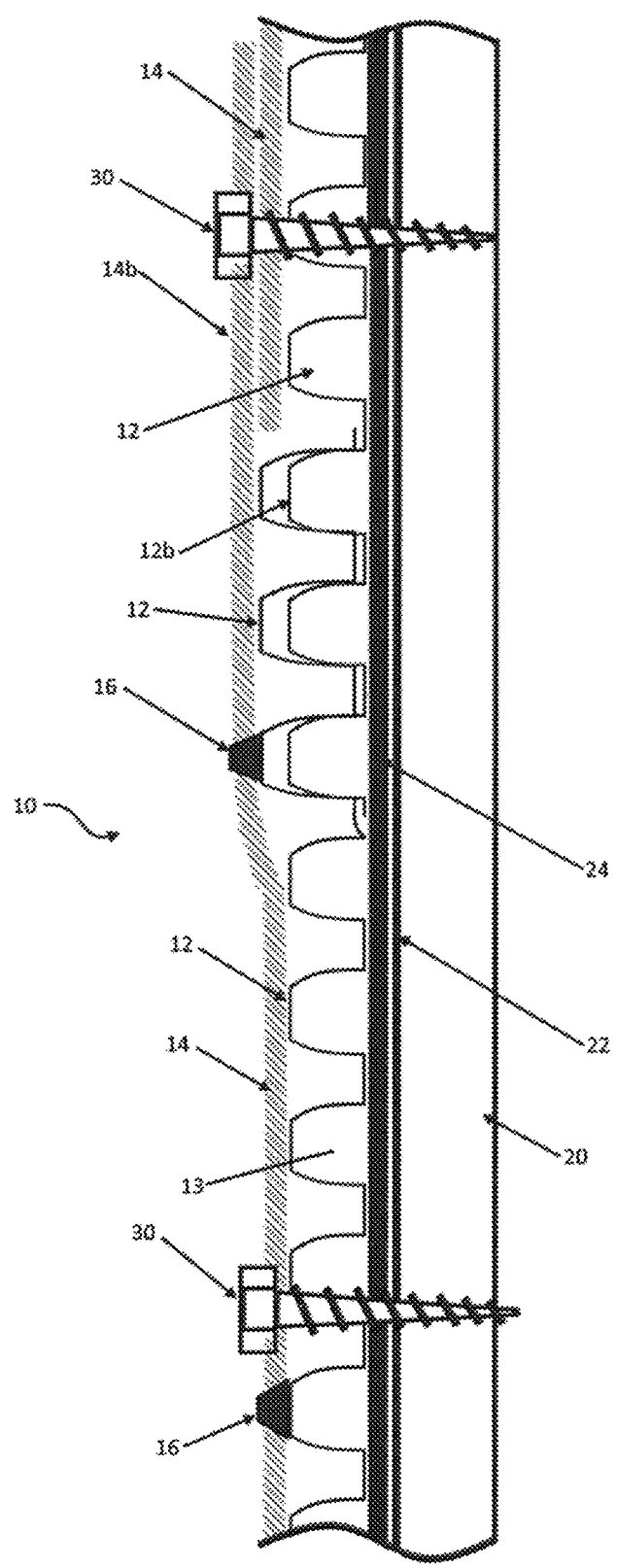
FIG. 1C illustrates a side view of a panelized lath and drainage plane system applied to a building exterior in accordance with an embodiment of the present invention.

As shown in FIG. 1B, a single panel 10 of a panelized lath and drainage plane system typically includes a patterned polymer board 12 with a lath panel 14 affixed thereto. In FIG. 1B, adhesive 16 is applied to the lath 14 and patterned polymer board 12. The patterned polymer board 12 is offset from the lath 14 such that exposed edges of the polymer board 12*b* and lath 14*b* allow the overlap and engagement of the patterned polymer board 12 with the exposed edge 12*b* of an adjacent polymer board 12. The exposed edge 14*b* of the metal lath 14 overlaps the lath 14 of an adjacent panel 10. The overlapping lath 14*b*, 14 delivers a stronger and more resilient cementitious layer and inhibits the formation of "storyline" cracks and thus inhibits mold, mildew, and other water and vapor damage.

As shown in FIG. 1C, a building exterior includes adjacent panels 10 of a panelized lath and drainage plane system, exemplarily an exterior wall panel 20, exemplarily a layer of plywood or oriented strand board (OSB), and two layers of weather-resistant barrier 22, 24 to inhibit rain from getting into the wall assembly. Generally, housewrap 22 (such as Tyvek®, duPont) is applied to the wall 20 followed by a layer of builders felt or tar paper 24. The patterned polymer board 12 and lath 14 panel 10 is applied to the wall 20. The drainage plane 13 is defined by the hollows created by the patterned polymer board 12. The drainage plane 13 allows liquid water to flow down to exit the wall structure at the base and allows water vapor to dissipate as well. The panel 10 includes patterned polymer board 12, lath 14, and adhesive 16 applied to the lath 14 and patterned polymer board 12 to keep the panel 10 together during shipping and installation when fasteners 30 are applied. On a wall 20, fasteners 30 (exemplarily screws such as zinc-coated lath screws (self-drilling or self-tapping)) may be used depending on the construction of the underlying structure, but any suitable fastener steel nails with a plastic cap or polymer collar or staples maintain the integrity of the system. The patterned polymer board 12 is offset from the lath 14 such that exposed edges of polymer board 12*b* and lath 14*b* allow the overlap and engagement of the patterned polymer board 12 with the exposed edge 12*b* of an adjacent polymer board 12. The exposed edge 14*b* of metal lath 14 overlaps lath 14 of an adjacent panel 10. The overlapping lath 14*b*, 14 delivers a stronger and more resilient cementitious layer and inhibits the formation of "storyline" cracks and thus inhibits mold, mildew, and other water damage.

Figure 1D:
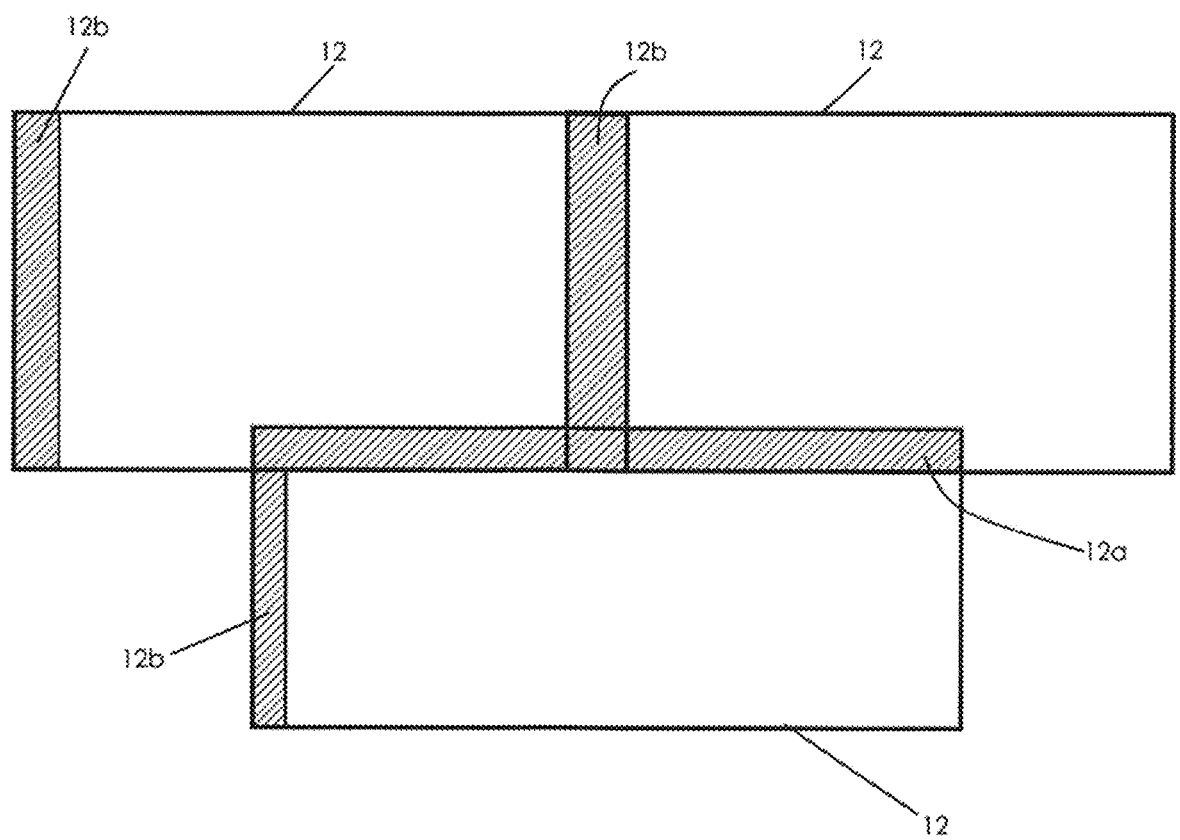
FIG. 1D illustrates a top view of a patterned polymer board overlap pattern of a drainage plane system applied to a building exterior in accordance with an embodiment of the present invention.

FIG. 1D illustrates the overlap of the patterned polymer board 12 with an adjacent polymer board 12 of the drainage plane system (for clarity, the lath 14 is not shown). Each polymer board 12 includes an exposed vertical overlap section 12*b* (shown on the left-hand side of the board in FIG. 1D) and horizontal overlap section 12*a* (shown on the top of the board in FIG. 1D). The exposed portions 12*a*, 12*b* are shaded and formed by the lath 14 being offset (as shown in FIG. 1A). A wall is built from the base upward. A first panel 10 with board 12 is applied to the wall, as discussed above, and a second panel 10 with a second sheet of patterned polymer 12 is applied such that the back-patterned polymer board 12 of the second panel 10 overlaps the exposed portion 12*b* of the first panel. Additional panels 10 are applied across the building. Additional panels 10 are applied in a second row above and the bottom of the additional panels 10 overlap the exposed upper portion 12*a* of the panels 10 below. Fasteners are applied through the panels 10 to adhere it to the structure wall.

Figure 1E:
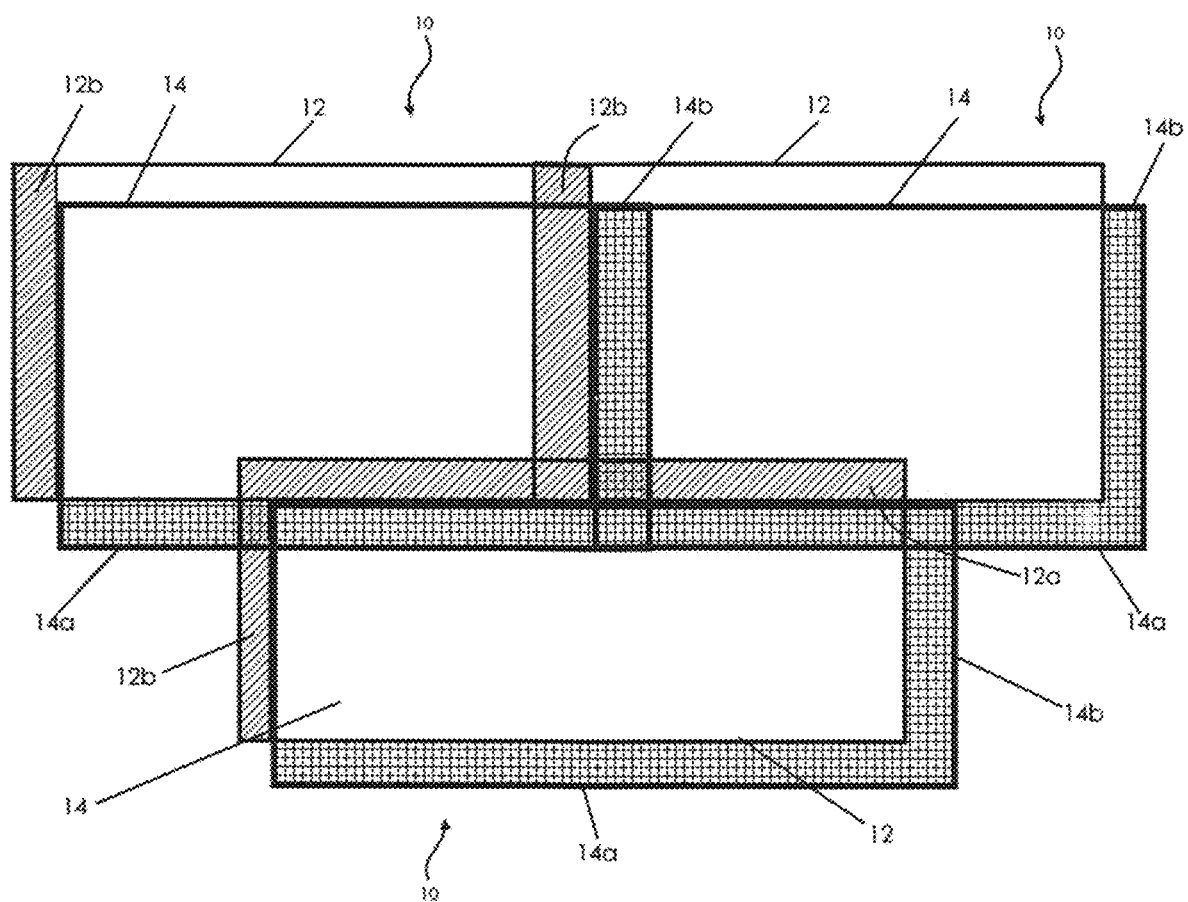
FIG. 1E illustrates a top view of a lath and drainage plane overlap pattern of a drainage plane system applied to a building exterior in accordance with an embodiment of the present invention.

FIG. 1E illustrates the overlap of the patterned polymer board 12 and lath 14 with adjacent panels 10 of the drainage plane system. As shown in FIG. 1D, adjacent panels 10, with polymer board 12, include an exposed vertical overlap section 12*b* (shown on the left-hand side of the board in FIG. 1D) and a horizontal overlap section 12*a* (shown on the top of the board in FIG. 1D), are applied to a wall. The exposed portions of polymer board 12*a*, 12*b* are diagonally shaded and formed by the lath 14 being offset (as shown in FIG. 1A). The lath 14 includes vertical overlap sections 14*b* and horizontal overlap sections 14*a*, which are crosshatched. A wall is built from the base upward. A first panel 10 with board 12 and lath 14 is applied to the wall, as discussed above, and a second panel 10 with a second sheet is applied such that the back of patterned polymer board 12 of the second panel 10 overlaps the exposed portion 12*b* of the first panel 10. Overlap portion 14*b* of lath 14 on the second panel 10 is placed over the lath 14 of the first panel 10. Additional panels 10 are applied across the building. Subsequent panels 10 are applied in a second row above and the bottom of the patterned polymer board 12 of additional panels 10 overlap the exposed upper portion 12*a* of the panels 10 below. The lateral overlap portion 14*b* extends from adjacent lath 14 of additional panels 10 and fasteners 30 are applied through the panels to adhere them to the structure to form a continuous lath 14 layer across the building structure. Fasteners are applied through the panels 10 to adhere them to the structure wall.

Figure 1F:
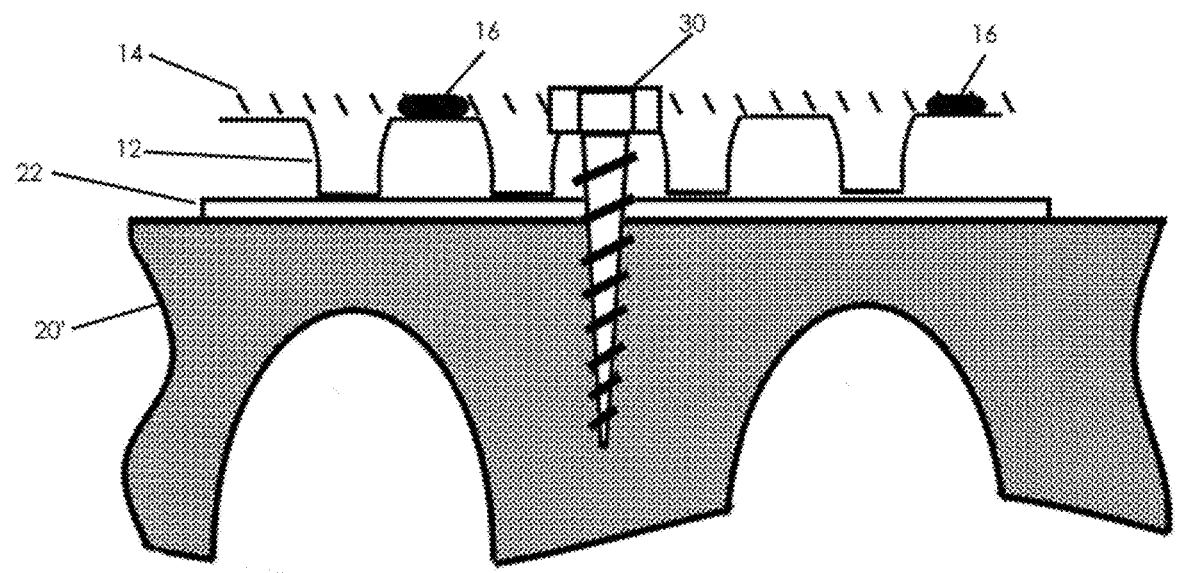
FIG. 1F illustrates a side view of a panelized lath and drainage plane system applied to a masonry building exterior in accordance with an embodiment of the present invention.

In FIG. 1F, a panelized lath and drainage plane panel 10 is applied to a masonry building exterior 20'. The drainage plane panel 10 includes patterned polymer board 12 and lath 14, with adhesive 16 applied to lath 14 and patterned polymer board 12 to keep the panel 10 together during shipping and installation when fasteners 30 are applied. The wall 20' is generally prepared with a single barrier layer 22, which is exemplarily a roll-on sealant. Fasteners 30 (generally screws, but any suitable fastener such as steel nails with a plastic cap or polymer collar or staples) maintain the integrity of the panel 10 and the wall 20'. A masonry wall 20' of block or a poured wall is shown with a layer of sealant 22 such as paint, Loxon® (Sherwin Williams) or liquid TYVEC®. Local building codes vary by climate and location.

Figure 1G:
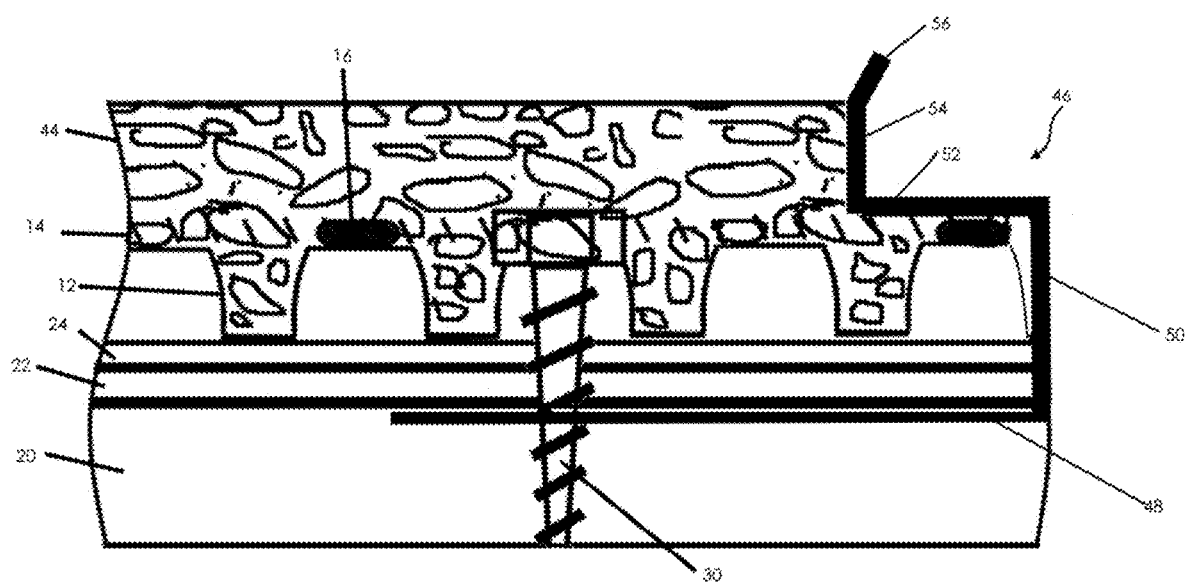
FIG. 1G illustrates a side view of a panelized lath and drainage plane system with an added mortar layer applied to a building exterior in accordance with an embodiment of the present invention.

In FIG. 1G, panelized lath and drainage plane panels 10 are applied to a building exterior which includes flashing 46 at the base of the wall 20. The drainage plane panels 10 include patterned polymer board 12 and lath 14 with adhesive 16 applied to the lath 14 and patterned polymer board 12 to keep the panels 10 together during shipping and installation when fasteners 30 are applied. The wall 20 is generally prepared with barrier layers 22, 24 while fasteners 30 maintain the integrity of panels 10 on the wall 20. A cementitious layer 44 is applied over the lath 14 and penetrates the lath 14 to fill the top patterned areas of the board 12. Flashing 46 is typically a sheet metal or polymer extrusion that includes a mount 48, a base 50, a riser 52, a spacer 54, and a kickout section 56. The flashing 46 may be used to shed water away from the foundation of the structure as the water flows down the face of the wall it is directed outward by kickout 56.

Figure 2A:
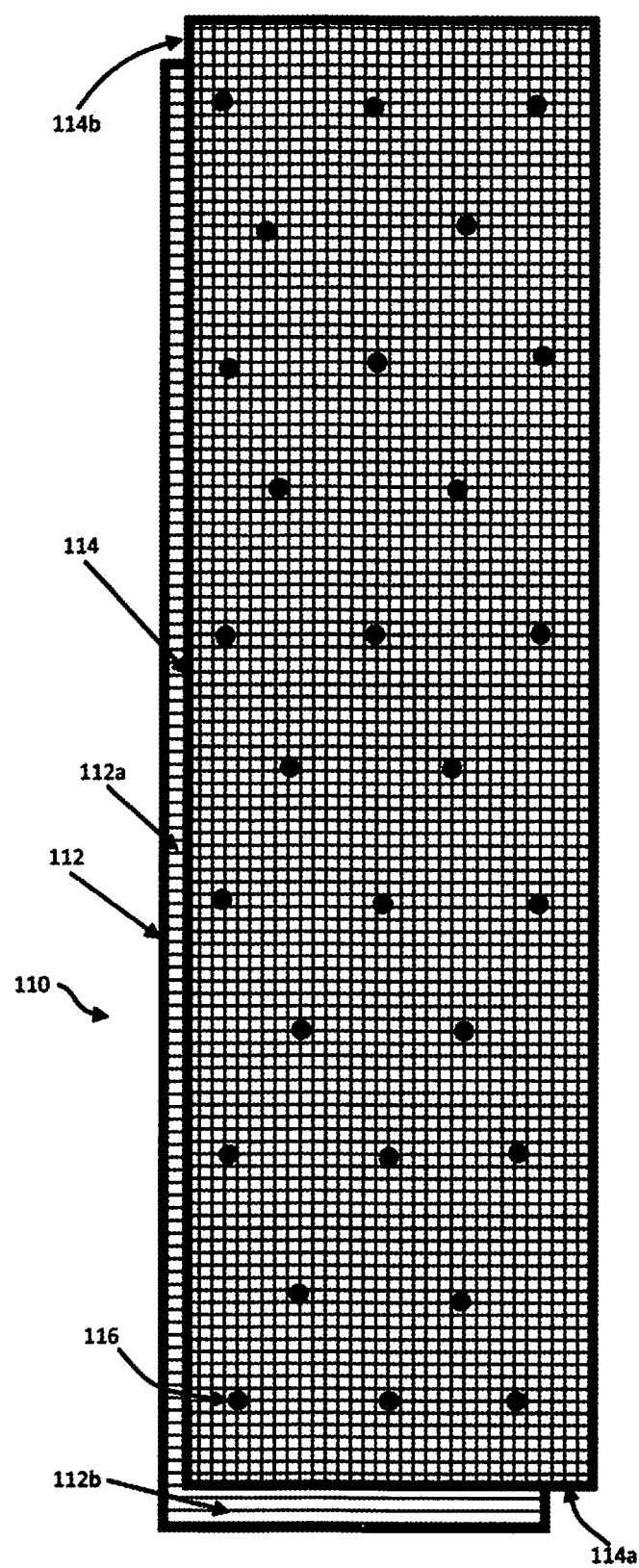
FIG. 2A illustrates a top view of a single panel of a panelized lath and drainage plane system for building exteriors in accordance with another embodiment of the present invention.
Figure 2B:
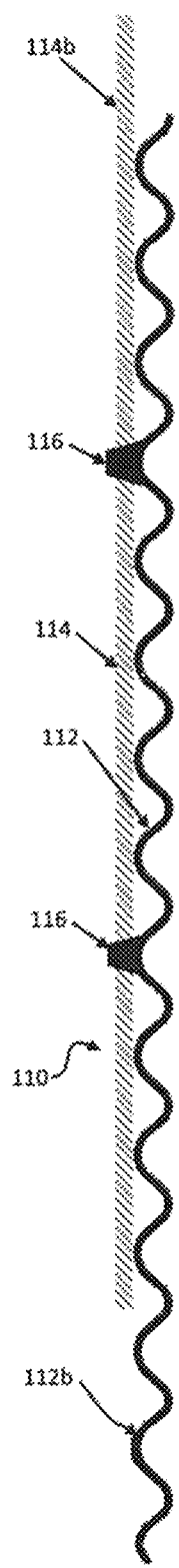
FIG. 2B illustrates a side view of a single panel of a panelized lath and drainage plane system for building exteriors in accordance with another embodiment of the present invention.
Figure 2C:
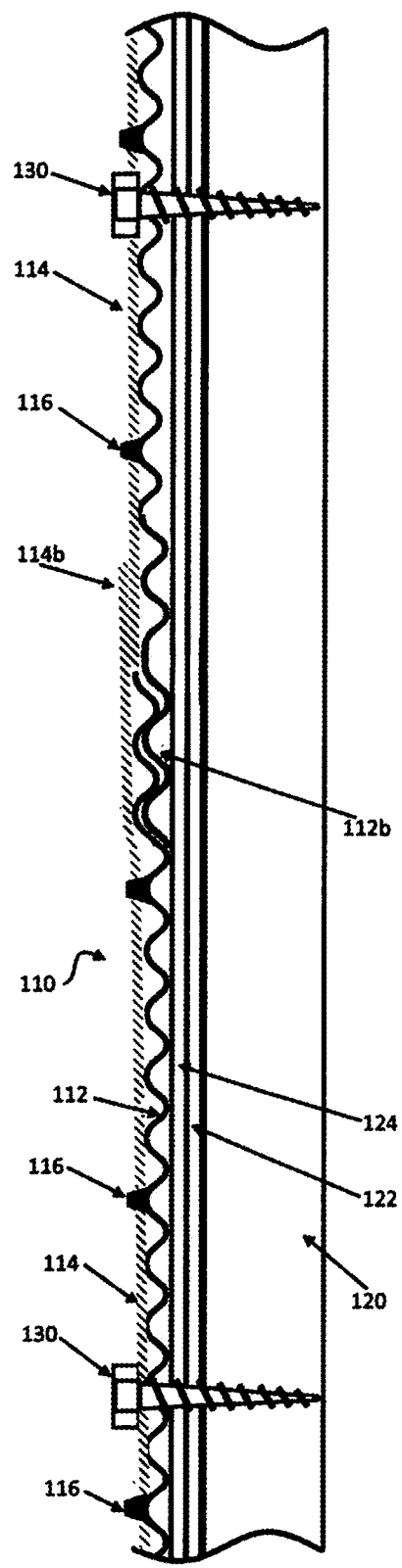
FIG. 2C illustrates a side view of a panelized lath and drainage plane system applied to a building exterior in accordance with another embodiment of the present invention.

As shown in FIG. 2A, a single panel 110 of a panelized lath and drainage plane system for building exteriors in accordance with the present invention may include a drainage plane defined by a patterned polymer board 112 with a lath panel 114 affixed by adhesive 116. Drainage plane panel 110, as shown in FIG. 2A-FIG. 2C, includes a corrugated polymer board 112 (such as an S-Shaped corrugation) exemplarily mounted to a metal lath 114 such as a galvanized expanded steel sheet such as a 2.5 pound per square yard or 3.4 pound per square yard diamond lath. The shape of polymer board 112 provides an open-air space drainage plane between the exterior of the structure 120 (as seen in FIG. 2C) and polymer board 112 to allow the egress of liquid water and water vapor. The lath 114 provides strength and flexibility such that a rugged surface is formed when a cementitious layer is applied over and surrounding the lath 114. The cementitious layer may also fill the patterning of the patterned polymer board 112. There may be an offset between lath 114 and patterned polymer board 112 such that adjacent edges 112a, 112b are exposed (shifted down and right in FIG. 2A). The offset provides an exposed surface 112a at the top of the polymer board 112 and 112b along an adjacent side such that the patterns on adjacent sheets may be mated on the wall to inhibit the ingress of liquid water. The lath 114 being offset provides exposed edges 114a, 114b to allow the lath 114 to overlap lath 114 of an adjacent panel 110. The overlapping lath 114 delivers a stronger and more resilient cementitious layer and inhibits the formation of "storyline" cracks at the edges of each sheet of lath 114.

As shown in FIG. 2B, a single panel 110 of a panelized lath and drainage plane system is shown with an S-shaped corrugated patterned polymer board 112 with a lath panel 114 affixed thereto. In FIG. 2B, adhesive 116 is applied to lath 114 and patterned polymer board 112. The patterned polymer board 112 is offset from the lath 114 such that exposed edges of polymer board 112a and lath 114b allow the overlap and engagement of the patterned polymer board 112 with the exposed edge 112b of an adjacent polymer board 112. The exposed edge 114a of metal lath 114 overlaps lath 114 of an adjacent assembly 110. The overlapping lath 114a, 114 delivers a stronger and more resilient cementitious layer and inhibits the formation of "storyline" cracks and inhibits mold, mildew, and other water damage.

FIG. 2C shows a building exterior with adjacent panels 110 of a panelized lath and drainage plane system. Shown are an exterior wall panel 120 with two layers of weather-resistant barrier 122, 124 to inhibit rain from getting into the wall assembly. Generally, housewrap 122 (such as Tyvek®) is applied to the wall 120 followed by a layer of builders felt or tar paper 124. The patterned polymer board 112 and lath 114 is applied to the wall 120. The drainage plane is defined by the hollows created by the corrugations of the patterned polymer board 112. The drainage plane allows liquid water to flow down to exit the wall structure at the base and allows water vapor to dissipate as well. The panels 110 include patterned polymer board 112, lath 114, and adhesive 116 applied to the lath 114 to keep the panels 110 together during shipping and installation when fasteners 130 are applied. On the wall 120, fasteners 130 (generally screws but any suitable fastener such as steel nails with a plastic cap or polymer collar, or staples) maintain the integrity of system of panels 110. The patterned polymer board 112 is offset from the lath 114 such that exposed edges of the polymer board 112b and the lath 114b allow the overlap and engagement of the corrugations of patterned polymer board 112 with the exposed edge 112b of an adjacent polymer board 112. The exposed edge 114a of metal lath 114 overlaps lath 114 of an adjacent panel 110. The overlapping lath 114a, 114 delivers a stronger and more resilient cementitious layer and inhibits the formation of "storyline" cracks and thus inhibits mold, mildew, and other water damage.

Figure 2D:
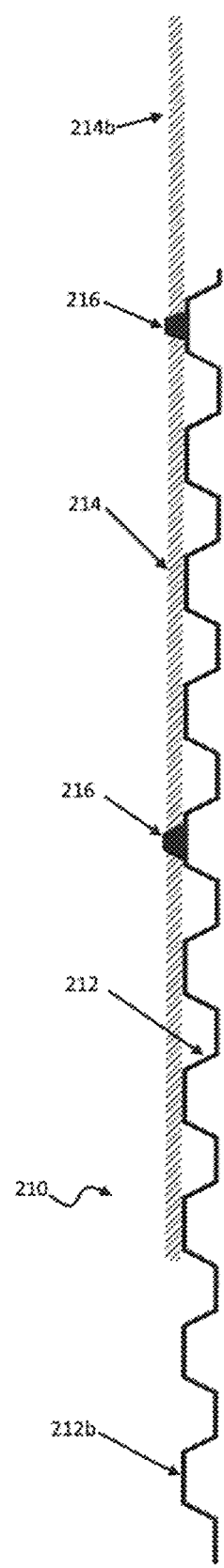
FIG. 2D illustrates a side view of a single panel of a panelized lath and drainage plane system for building exteriors in accordance yet with another embodiment of the present invention.

FIG. 2D shows a single panel 210 of a panelized lath and drainage plane system with a box-beam corrugated patterned polymer board 212 with a lath panel 214 affixed thereto. In FIG. 2D, adhesive 216 is applied to lath 214 and patterned polymer board 212. The patterned polymer board 212 is offset from the lath 214 such that exposed edges of polymer board 212a and lath 214b allow the overlap and engagement of the patterned polymer board 212 with the exposed edge 212b of an adjacent polymer board 212. The exposed edge 214a of the metal lath 214 overlaps the lath 214 of an adjacent assembly 210. The overlapping lath 214a, 214 delivers a stronger and more resilient cementitious layer and inhibits the formation of "storyline" cracks and thus inhibits mold, mildew, and other water damage.

Figure 2E:
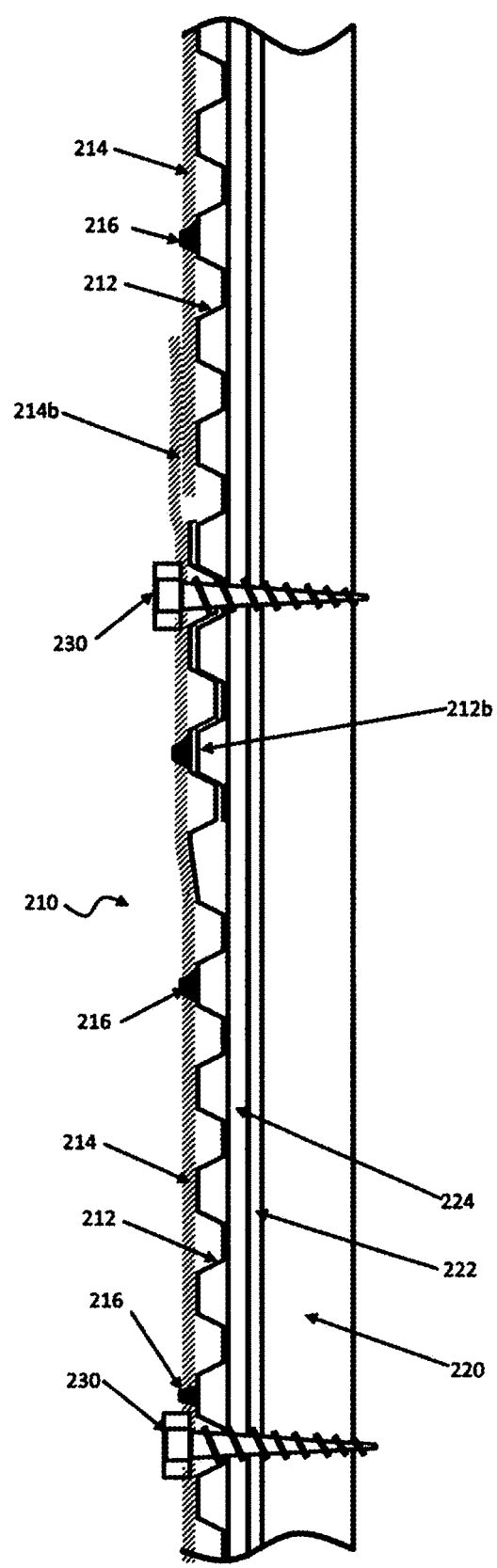
FIG. 2E illustrates a side view of a panelized lath and drainage plane system applied to a building exterior in accordance with yet another embodiment of the present invention.

FIG. 2E shows a building exterior with adjacent panels 210 of a panelized lath and drainage plane system. Shown are an exterior wall panel 220 and two layers of weather-resistant barrier 222, 224 to inhibit rain from getting into the wall assembly. Generally, housewrap 222 (such as Tyvek®) is applied to the wall 220 followed by a layer of builders felt or tar paper 224. The patterned polymer board 212 and lath 214 is applied to the wall 220. The drainage plane is defined by the hollows created by the corrugations of the patterned polymer board 212. The drainage plane allows liquid water to flow down to exit the wall structure at the base and allows water vapor to dissipate as well. The panels 210 include patterned polymer board 212 and lath 214 with adhesive 216 applied to the lath 214 and patterned polymer board 212 to keep the panels 210 together during shipping and installation when fasteners 230 are applied. On the wall 220, fasteners 230, such as screws, nails with a plastic cap or polymer collar, or staples, maintain the integrity of panels 210. The patterned polymer board 212 is offset from the lath 214 such that exposed edges of polymer board 212b and lath 214b allow the overlap and engagement of the corrugations of patterned polymer board 212 with the exposed edge 212b of an adjacent polymer board 212. The exposed edge 214a of the metal lath 214 overlaps the lath 214 of an adjacent panel 210. The overlapping lath 214a, 214 delivers a stronger and more resilient cementitious layer and inhibits the formation of "storyline" cracks and thus inhibits mold, mildew, and other water damage.

Figure 3A:
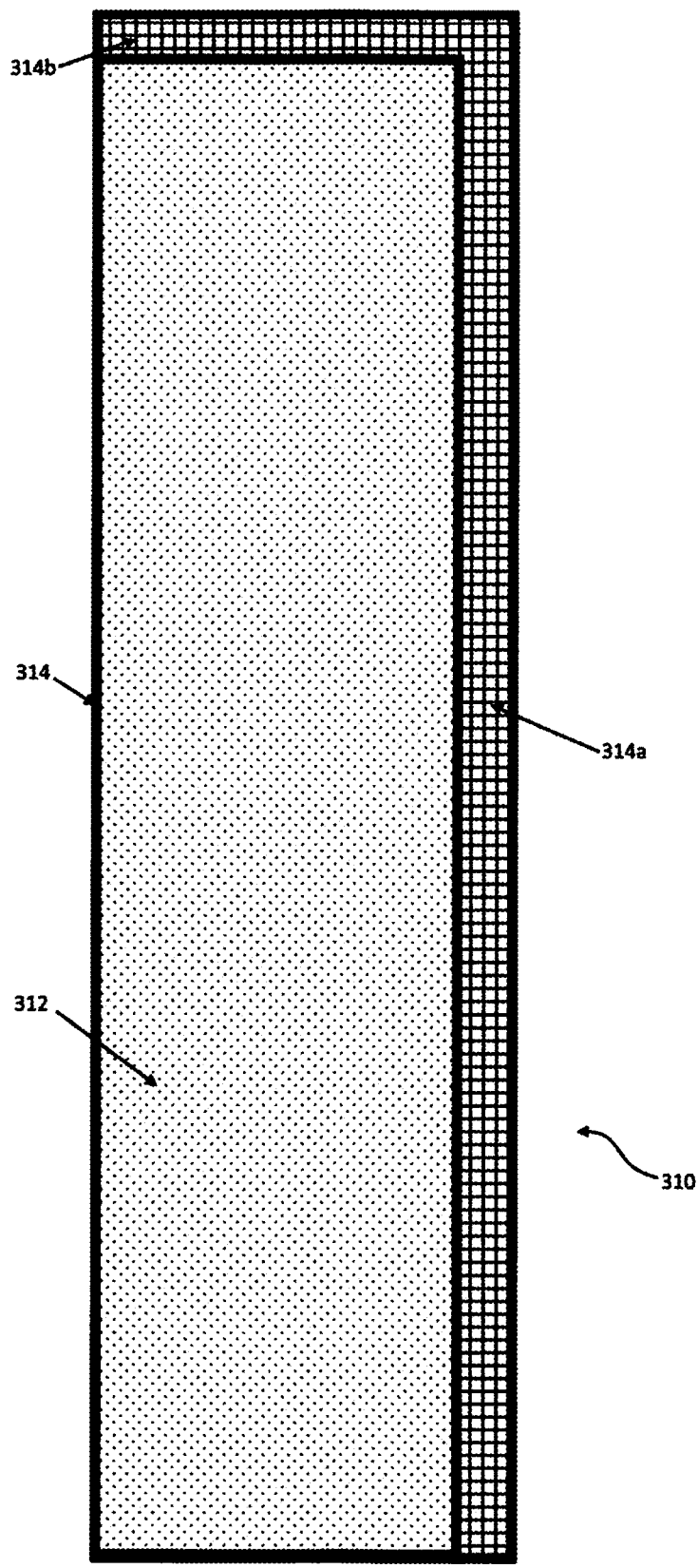
FIG. 3A illustrates a bottom view of a single panel of a panelized lath and drainage plane system for building exteriors in accordance with still another embodiment of the present invention.

As shown in FIG. 3A, a single panel 310 of a panelized lath and drainage plane system for building exteriors in accordance with the present invention exemplarily includes a patterned polymer board 312 with a lath panel 314 affixed thereto. In FIG. 3A, the pattern shown is a dimpled polymer sheet 312. A panel 310 may be formed by adhesive 316 applied to the lath 314 and patterned polymer board 312 such as dimple board. The patterned polymer board 312 is preferably mounted to a metal lath 314. As shown in FIG. 3A, the lath 314 is larger than the patterned polymer board 312 such that adjacent lath edges 314a, 314b are exposed. Exposed edges 314a, 314b allow the lath to overlap the lath 314 of an adjacent panel 310 while the patterned polymer board 312 abuts at the edge of patterned polymer board 312 of an adjacent panel 310. The overlapping lath edges 314a, 314b deliver a stronger and more resilient cementitious layer and inhibits the formation of "storyline" cracks at the edges of each panel 310. Once the cementitious layer has cured, a decorative layer such as stucco or a stone fascia may be applied.

Figure 3B:
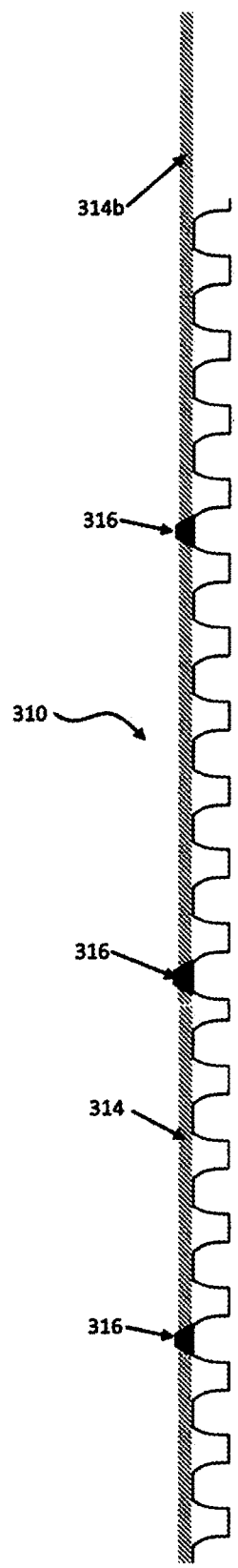
FIG. 3B illustrates a side view of a single panel of a panelized lath and drainage plane system for building exteriors in accordance with still another embodiment of the present invention.

As shown in FIG. 3B, a single panel 310 of a panelized lath and drainage plane system exemplarily includes a patterned polymer board 312 with a lath panel 314 affixed thereto. In FIG. 3B, adhesive 316 is applied to lath 314 and patterned polymer board 312. The lath 314 is larger than the patterned polymer board 312 such that two edges of board 312 and two edges of lath 314 are aligned and two opposed edges lath 314b extend beyond board 312 to overlap and engage lath 314 of an adjacent panel 310. The overlapping lath 314b, 314 delivers a stronger and more resilient cementitious layer and inhibits the formation of "storyline" cracks and thus inhibits mold, mildew, and other water damage.

Figure 3C:
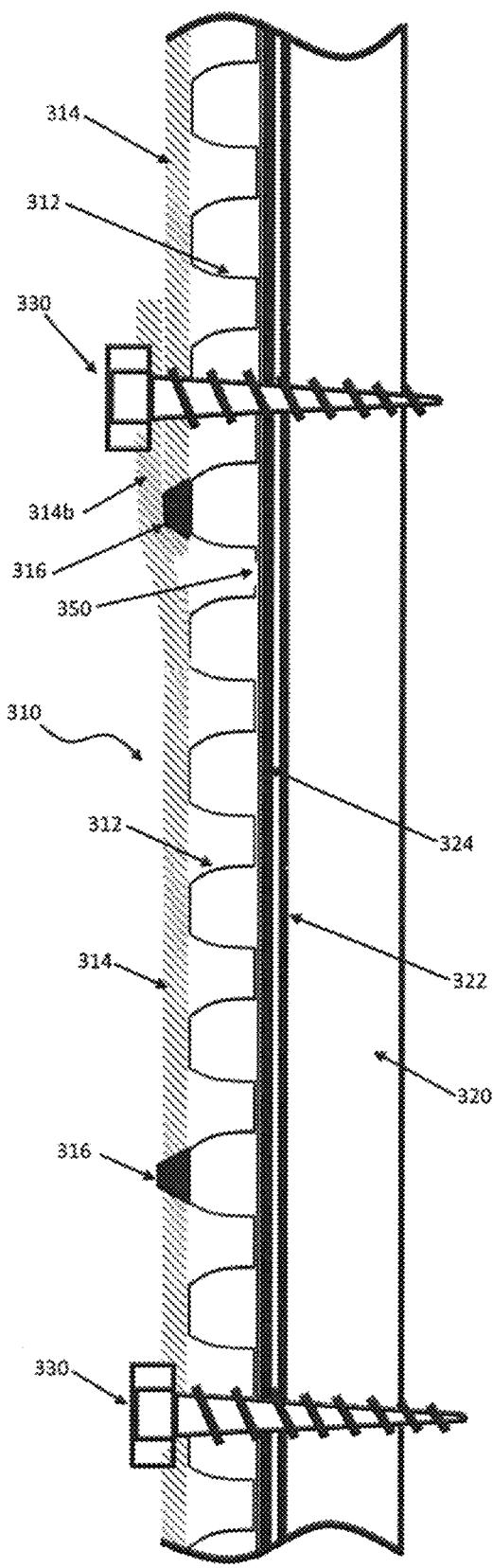
FIG. 3C illustrates a side view of a panelized lath and drainage plane system applied to a building exterior in accordance with still another embodiment of the present invention.

FIG. 3C shows a building exterior with adjacent panels 310 of a panelized lath and drainage plane system. Shown are an exterior wall panel 320 with two layers of weather-resistant barrier 322, 324 to inhibit rain from getting into the wall assembly. Generally, housewrap 322 (such as Tyvek®) is applied to wall 320 followed by a layer of builders felt or tar paper 324. A panel 310 is applied to wall 320 to define a drainage plane created by the patterned polymer board 312. The drainage plane allows liquid water to flow down to exit the wall structure at the base and allows water vapor to dissipate as well. The panel 310 includes patterned polymer board 312, lath 314, and adhesive 316 applied to the lath 314 and board 312 to keep the panel together during shipping and installation. On the wall 320, fasteners 330, such as screws, nails with a plastic cap or polymer collar, or staples maintain the integrity of the panels 310. The lath 314 is larger than the patterned polymer board 312 such that an exposed edge of lath 314b overlaps and engages the lath 314 of an adjacent panel 310. The overlapping lath 314b, 314 provides a stronger and more resilient cementitious layer and inhibits the formation of "storyline" cracks and thus inhibits mold, mildew, and other water damage.

Figure 3D:
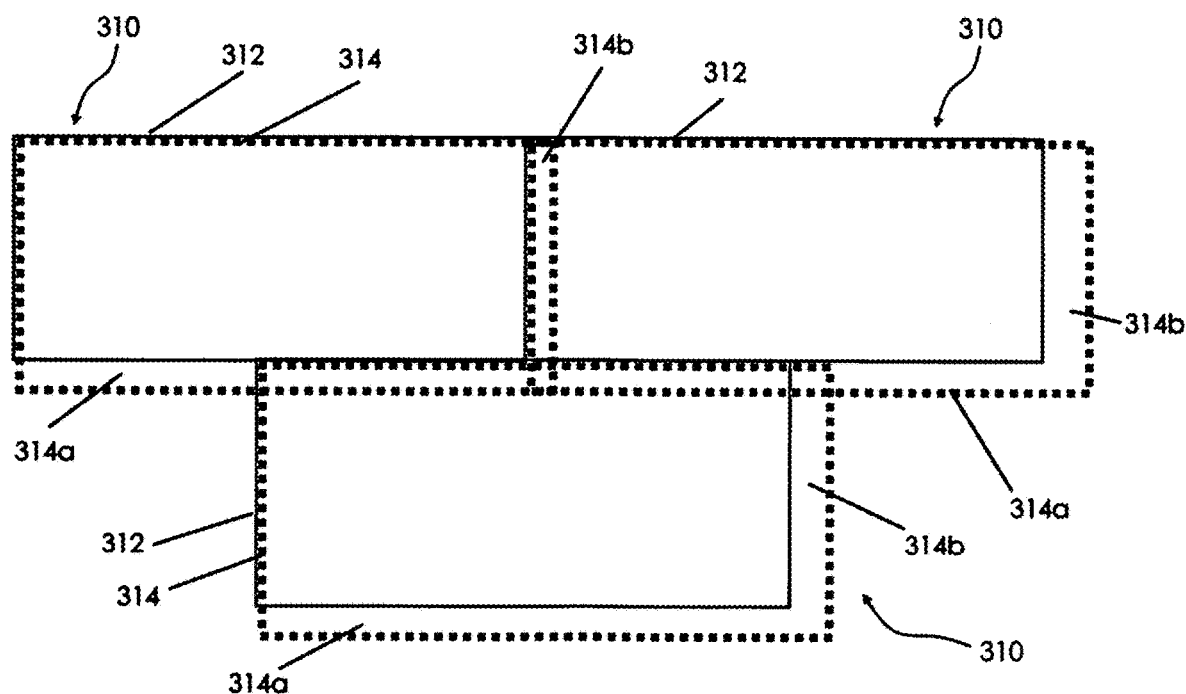
FIG. 3D illustrates a top view of the lath and drainage plane overlap pattern of the drainage plane system applied to a building exterior in accordance with still another embodiment of the present invention.

As shown in FIG. 3D, panels 310 of a panelized lath and drainage plane system are applied in an overlapping pattern such that the patterned polymer boards 312 abut and lath panel 314 is affixed thereto. The lath 314 is larger than the patterned polymer board 312 such that an exposed edge of the lath 314b overlaps and engages lath 314 of horizontally adjacent panel 310 and exposed edge of lath 314a overlaps and engages lath 314 of panels 310 below. The overlapping lath 314a, 314b, 314 delivers a stronger and more resilient cementitious layer and inhibits the formation of 'storyline' cracks and thus inhibits mold, mildew, and other water damage.

Figure 4A:
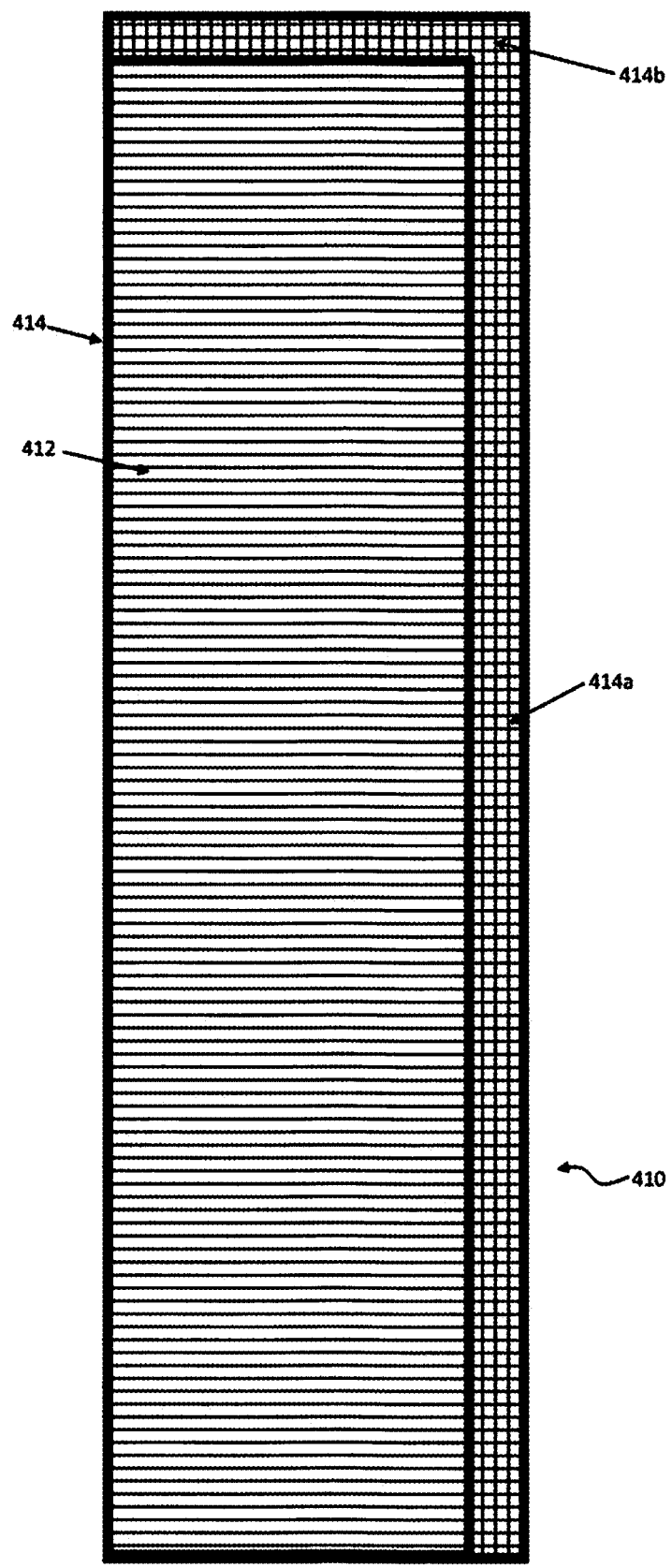
FIG. 4A illustrates a bottom view of a single panel of a panelized lath and drainage plane system for building exteriors in accordance with yet another embodiment of the present invention.

As shown in FIG. 4A, a single panel 410 of a panelized lath and drainage plane system for building exteriors in accordance with the present invention exemplarily includes a patterned polymer board 412 with a lath panel 414 affixed thereto. In FIG. 4A, the pattern shown is a corrugated polymer sheet 412. A panel 410 may be formed by adhesive 416 applied to the lath 414 and patterned polymer board 412. As shown in FIG. 4A, the lath 414 is larger than patterned the polymer board 412 such that adjacent edges 414a, 414b are exposed. Exposed edges 414a, 414b allow the lath 414 to overlap the lath 414 of adjacent panels 410, while the patterned polymer board 412 abuts at the edge of the patterned polymer board 412 of an adjacent panel 410. The overlapping lath edges 414a, 4314b deliver a stronger and more resilient cementitious layer and inhibits the formation of "storyline" cracks at the edges of each panel 410. Once the cementitious layer has cured, a decorative layer such as stucco or a stone fascia may be applied.

Figure 4B:
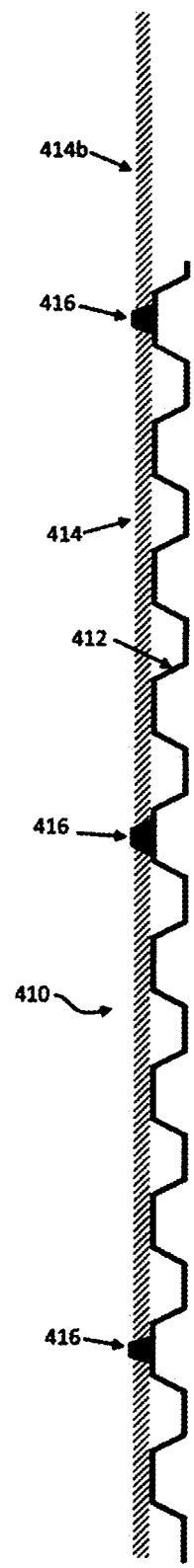
FIG. 4B illustrates a side view of a single panel of a panelized lath and drainage plane system for building exteriors in accordance with yet another embodiment of the present invention.

As shown in FIG. 4B, a single panel 410 of a panelized lath and drainage plane system exemplarily includes a patterned polymer board 412 with a lath panel 414 affixed thereto. In FIG. 4B, adhesive 416, for example, is applied to the lath 414 and box beam patterned polymer board 412. The lath 314 is larger than the patterned polymer board 412 such that exposed edge of the lath 414b overlaps and engages the lath 414 of an adjacent panel 410. The overlapping lath 414b, 414 delivers a stronger and more resilient cementitious layer and inhibits the formation of "storyline" cracks and thus inhibits mold, mildew, and other water damage.

Figure 4C:
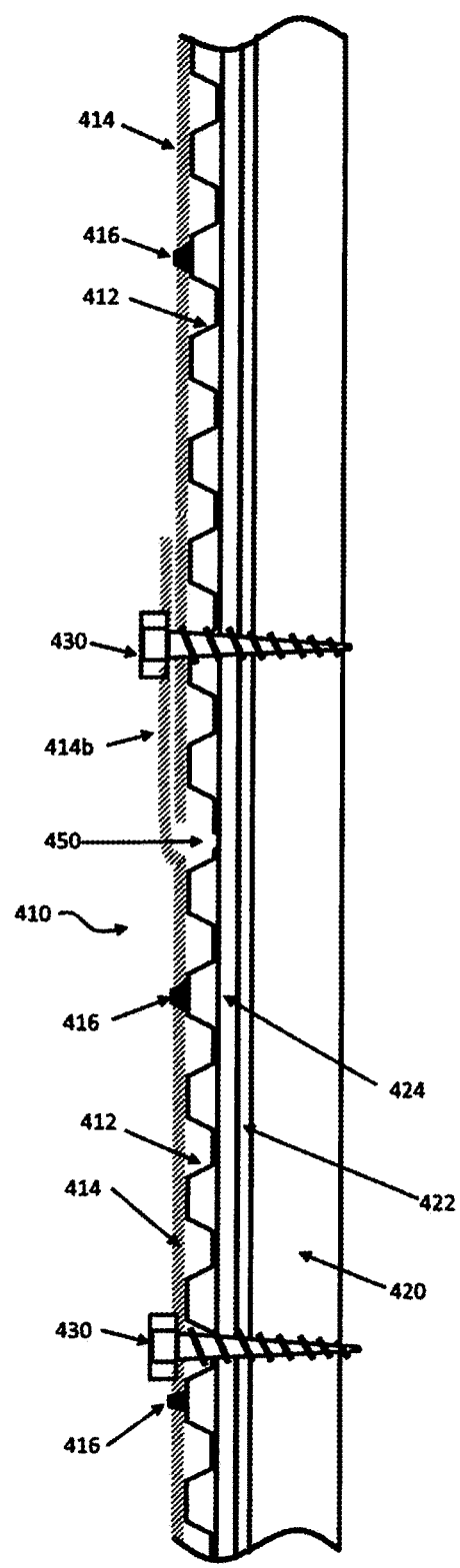
FIG. 4C illustrates a side view of a panelized lath and drainage plane system applied to a building exterior in accordance with yet another embodiment of the present invention.

FIG. 4C shows a building exterior with adjacent panels 410 of a panelized lath and drainage plane system. Shown are an exterior wall panel 420 with two layers of weather-resistant barrier 422, 424 to inhibit moisture from getting into the wall assembly. Generally, housewrap 422 (such as Tyvek®) is applied to the wall 420 followed by a layer of builders felt or tar paper 424. A panel 410 is applied to wall 420 to define a drainage plane created by the patterned polymer board 412. The drainage plane allows liquid water to flow down to exit the wall structure at the bottom and allows water vapor to dissipate as well. The panel 410 includes patterned polymer board 412, lath 414, and adhesive 416 to keep the panel 410 together during shipping and installation. On the wall 420, fasteners 430 such as screws, nails with a plastic cap or polymer collar, or staples maintain the integrity of system panels 410. The lath 414 is larger than the patterned polymer board 412 such that exposed edge of lath 414b overlaps and engages lath 414 of an adjacent panel 410. The overlapping lath 414b, 414 provides a stronger and more resilient cementitious layer and inhibits the formation of "storyline" cracks and thus inhibits mold, mildew, and other water damage.

Figure 5A:
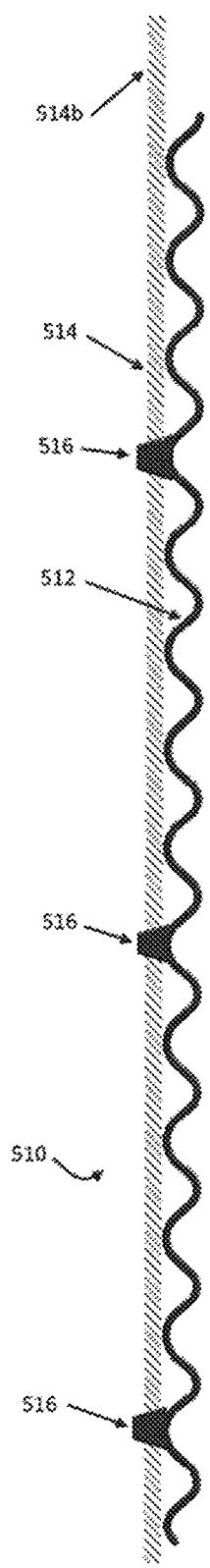
FIG. 5A illustrates a side view of a single panel of a panelized lath and drainage plane system for building exteriors in accordance with still another embodiment of the present invention.

As shown in FIG. 5A, a single panel 510 (similar to that of FIG. 4A) of a panelized lath and drainage plane system exemplarily includes a patterned polymer board 512 with a lath panel 514 affixed thereto. In FIG. 5A an adhesive 516 is applied to the lath 514 and corrugated polymer board 512. The lath 5414 is larger than the patterned polymer board 512 such that an exposed edge of lath 514b overlaps and engages the lath 514 of an adjacent panel 510. The overlapping lath 514b, 514 delivers a stronger and more resilient cementitious layer and inhibits the formation of "storyline" cracks and thus inhibits mold, mildew, and other water damage.

Figure 5B:
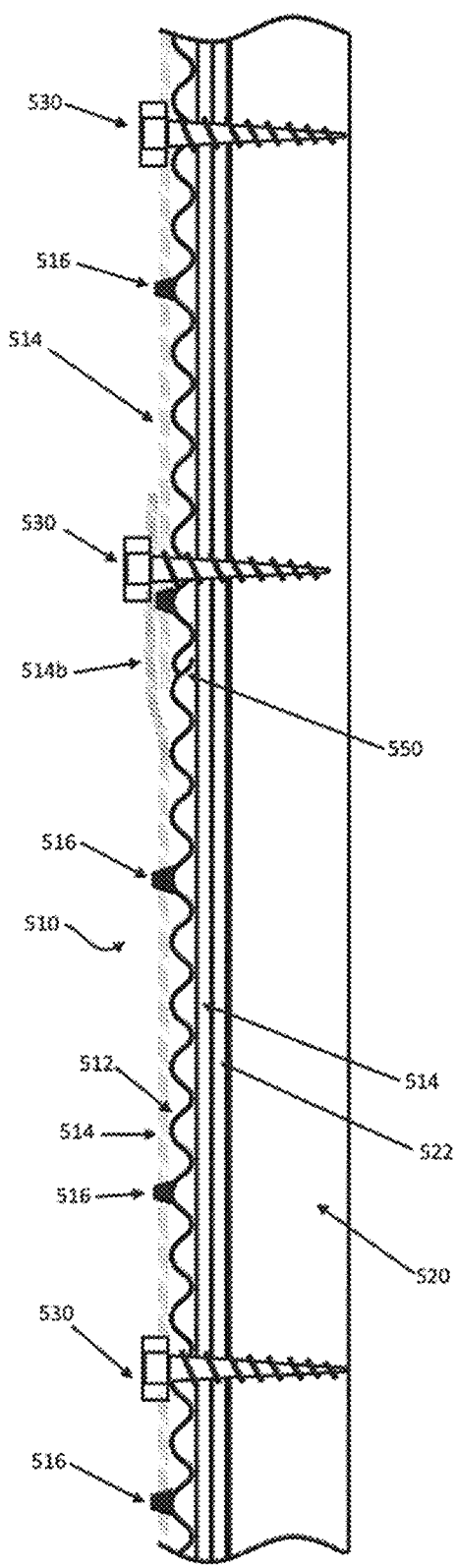
FIG. 5B illustrates a side view of a panelized lath and drainage plane system applied to a building exterior in accordance with still another embodiment of the present invention.

FIG. 5B shows a building exterior with adjacent panels 510 of a panelized lath and drainage plane system. Shown are an exterior wall panel 520 with two layers of weather-resistant barrier 522, 524 to inhibit moisture from getting into the wall assembly. Generally, housewrap 522 (such as Tyvek®) is applied to the wall 520 followed by a layer of builders felt or tar paper 524. A panel 510 is applied to the wall 520 to define a drainage plain created by the corrugated patterned polymer board 512. The drainage plane allows liquid water to flow down to exit the wall structure at the bottom and allows water vapor to dissipate as well. The panel 510 includes patterned polymer board 512, lath 514, and adhesive 516 to keep the panel 510 together during shipping and installation. On the wall 520, fasteners 530 such as screws, nails with a plastic cap or polymer collar, or staples maintain the integrity of panels 510. The lath 514 is larger than the patterned polymer board 512 such that an exposed edge of lath 514b overlaps and engages the lath 514 of an adjacent panel 510. The overlapping lath 514b, 514 provides a stronger and more resilient cementitious layer and inhibits the formation of "storyline" cracks and thus inhibits mold, mildew, and other water damage.

Figure 6A:
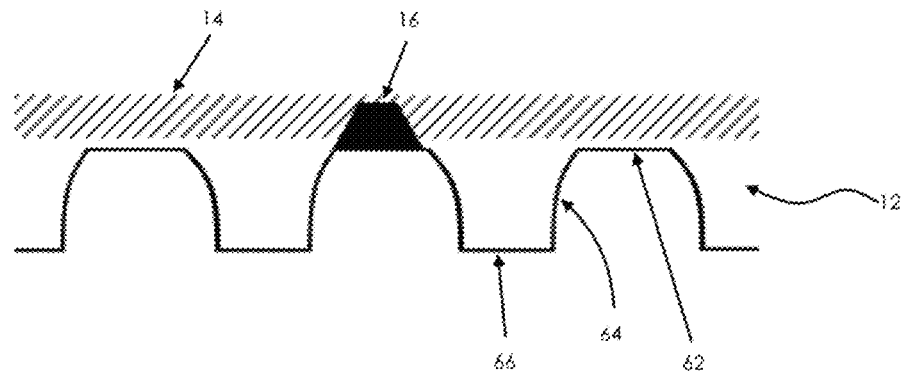
FIG. 6A illustrates a detailed side view of an adhesive fixing a lath to a drainage layer in a single panel of a panelized lath and drainage plane system for building exteriors in accordance still with one embodiment of the present invention.

FIG. 6A illustrates a side view of the use of an adhesive 16 to affix lath 14 to a pattered polymer board 12 in a lath and drainage plane panel 10. The board 12 includes a base 66 and a face 62 defined by side walls 64 raised sections defining continuous hollows beneath and between the raised sections. The sidewalls 64 may be vertical and continuous as shown in FIG. 2A to define vertical box beam corrugations (as shown in FIG. 2D) or vertical S-shaped corrugations (as shown in FIG. 2B). The sidewalls 64 may also be discontinuous to form a raised pattern such as dimples (as shown in FIG. 1A). Generally, building codes provide the requirements for height of the hollows and the speed at which liquids must drain from the area of the hollows. Current building codes require a 7/16-inch gap in a number of states in the United States and a 10 mm gap in Canada. Adhesives may include any suitable adhesive for example, hot melt adhesives such as polyamides, EVAs, polyolefins, polyesters, or polyurethanes and epoxies such as bisphenol A epoxy resin, bisphenol F epoxy resin, Novolac epoxy resin, or cycloaliphatic epoxy resin. Other adhesives such as acrylic resin, polyurethane monomers, or styrene-butadiene rubber may be used. The adhesive is used to maintain the structure of the panel during shipping and installation. The mechanical fasteners used to mount the panel to the building help provide the mechanical strength of the panel on the wall.

Figure 6B:
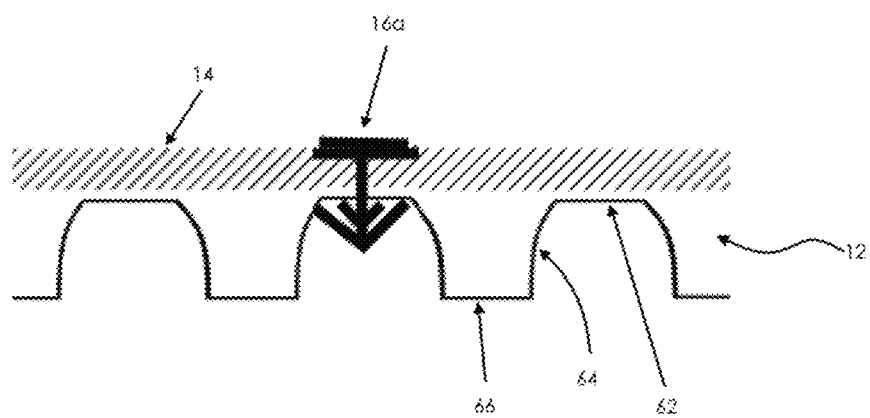
FIG. 6B illustrates a detailed side view of a Christmas tree fastener fixing a lath to a drainage layer in a single panel of a panelized lath and drainage plane system for building exteriors in accordance still with one embodiment of the present invention.

FIG. 6B illustrates a side view of a "Christmas tree" fastener to affix a lath 14 to a pattered polymer board 12 in a panelized lath and drainage plane panel 10. The board 12 includes a base 66 and a face 62 defined by the side walls 64 raised sections defining continuous hollows beneath and between the raised sections. The sidewalls 64 may be vertical and continuous as shown in FIG. 2A, to define vertical box beam corrugations (as shown in FIG. 2D), or vertical S-shaped corrugations (as shown in FIG. 2B). The sidewalls 64 may also be discontinuous to form a raised pattern such as dimples (as shown in FIG. 1A).

Figure 6C:
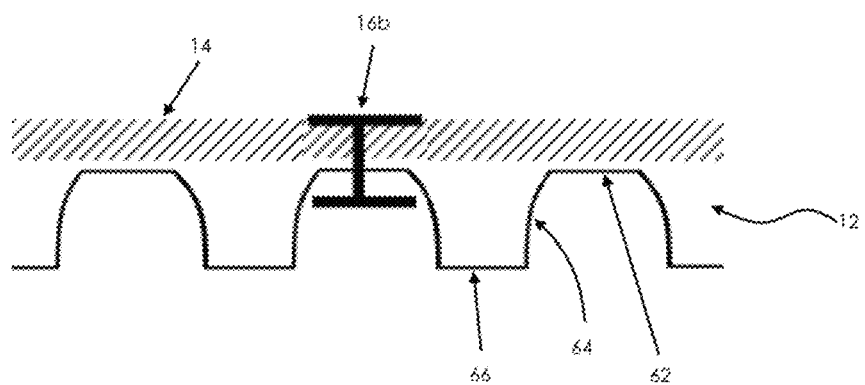
FIG. 6C illustrates a detailed side view of a rivet fixing a lath to a drainage layer in a single panel of a panelized lath and drainage plane system for building exteriors in accordance still with one embodiment of the present invention.

FIG. 6C illustrates a detailed side view of a rivet to affix lath 14 to pattered polymer board 12 in a panelized lath and drainage plane panel 10. The board 12 includes a base 66 and a face 62 defined by side walls 64, raised sections defining continuous hollows beneath and between the raised sections. The sidewalls 64 may be vertical and continuous as shown in FIG. 2A, to define vertical box beam corrugations (as shown in FIG. 2D), or vertical S-shaped corrugations (as shown in FIG. 2B). The sidewalls 64 may also be discontinuous to form a raised pattern such as dimples (as shown in FIG. 1A).

Figure 6D:
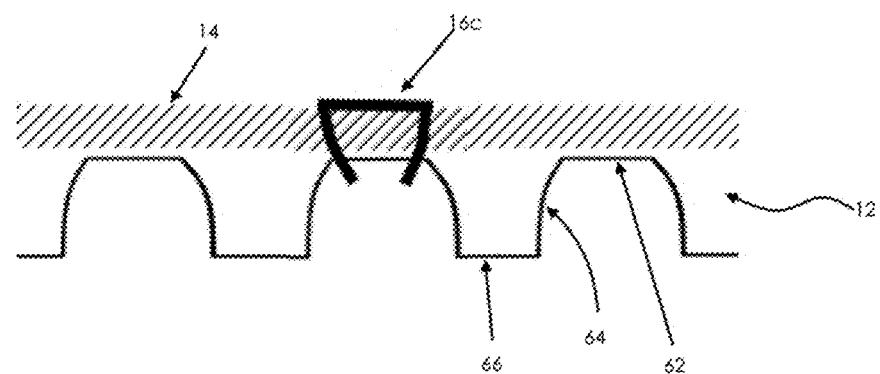
FIG. 6D illustrates a detailed side view of an adhesive fixing a lath to a drainage layer in a single panel of a panelized lath and drainage plane system for building exteriors in accordance with one embodiment of the present invention.

FIG. 6D illustrates a detailed side view of a staple to fix a lath 14 to a pattered polymer board 12 in a panelized lath and drainage plane panel 10. The board 12 includes a base 66 and a face 62 defined by side walls 64, raised sections defining continuous hollows beneath and between the raised sections. The sidewalls 64 may be vertical and continuous as shown in FIG. 2A, to define vertical box beam corrugations (as shown in FIG. 2D), or vertical S-shaped corrugations (as shown in FIG. 2B). The sidewalls 64 may also be discontinuous to form a raised pattern such as dimples (as shown in FIG. 1A).

Figure 7:
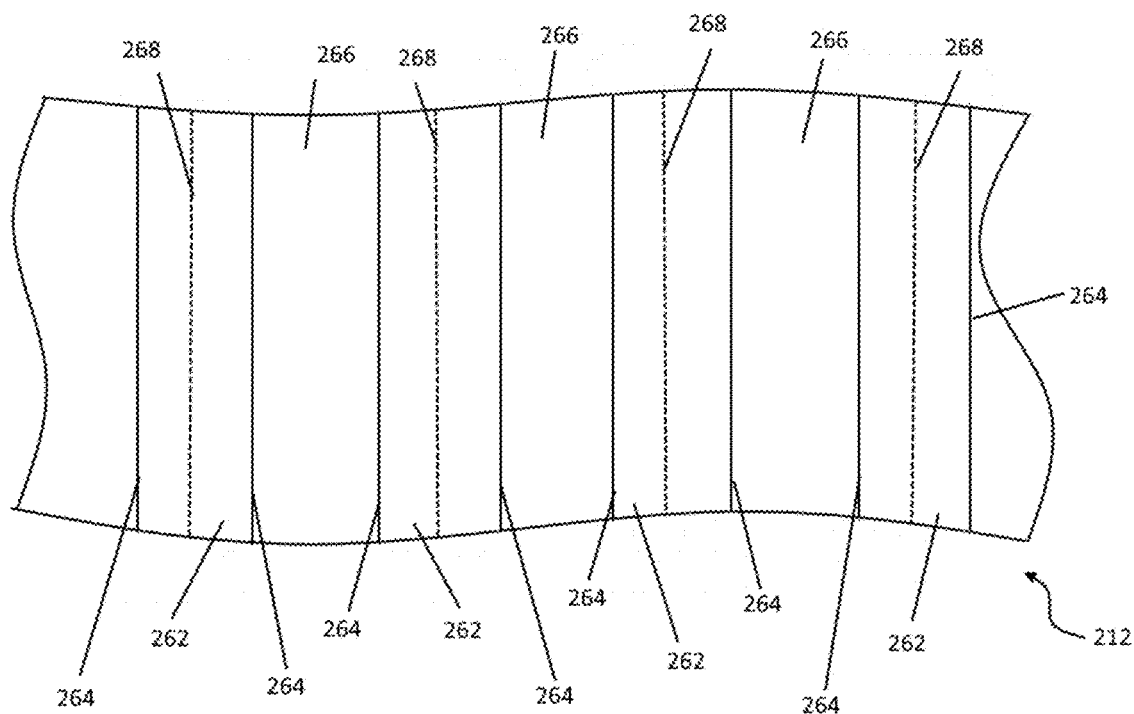
FIG. 7 illustrates a detailed top view of perforations in a patterned polymer layer of a panelized lath and drainage plane system in accordance with one embodiment of the present invention.

FIG. 7 shows perforations 268 in a patterned polymer board 212. The cementitious layer 44 (as shown in FIG. 1G) provides some transport of water or water vapor. Typically, polymer boards 212 (or 12 as shown in FIG. 1A or 112 as shown in FIG. 2B) are impermeable to liquids and vapors so perforations 268 may be included. The board 212 includes base 266 and face 262 defined by side walls 264 raised sections defining continuous hollows beneath and between the raised sections. The sidewalls 264 may be vertical and continuous as shown in FIG. 2A, to define vertical box beam corrugations (as shown in FIG. 2D), or vertical S-shaped corrugations (as shown in FIG. 2B). The sidewalls 64 may also be discontinuous to form a raised pattern such as dimples (as shown in FIG. 1A). The perforations may be in the form of slits or holes that inhibit the flow of the cementitious material but allow moisture to contact the cementitious material and be transported to the face of the wall.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

What is claimed is:

1. A lath and patterned polymer board panel for building exteriors, comprising:
   a rectangular patterned polymer board, the polymer board comprising:
      a base and a face defined by raised sections defining continuous hollows beneath the raised sections; and
      first and second pairs of adjacent edges; and wherein,
         when installed on a wall, the polymer board;

is free from mortar holes capable of allowing mortar bridging or mortar droppings through the polymer board and toward the interior of the wall; and allows for the free passage of moisture through the continuous hollows, thereby avoiding the retention of moisture; and a rectangular lath panel affixed to the board, the lath panel comprising first and second pairs of adjacent edges, and wherein:

the lath panel is arranged on the polymer board such that the first pair of adjacent edges of the lath panel overhang the first pair of adjacent edges of the polymer board; and when the lath and patterned polymer board is applied to the wall, the polymer board is in continuous contact with the wall and the polymer board is sandwiched between the wall and the lath.

2. The panel of claim 1, further comprising perforations formed in the patterned polymer board.

3. The panel of claim 1, wherein the hollows are vertical channels.

4. The panel of claim 1, wherein the continuous hollows provide an open-air space sufficient to allow the egress of liquid water and water vapor.

5. The panel of claim 4, wherein the raised sections defining the continuous hollows provide an open-air space of at least about ¼-inch to allow the egress of liquid water and water vapor.

6. The panel of claim 1, wherein the second pair of polymer board adjacent edges and the second pair of lath adjacent edges are aligned.

7. The panel of claim 1, wherein the second pair of polymer board adjacent edges overhang the second pair of lath adjacent edges.

8. The panel of claim 7, wherein the overhanging pair of edges of the patterned polymer board are sufficiently exposed to be covered by the patterned polymer board of subsequently applied panels to form an overlapping water barrier layer.

9. A lath and patterned polymer board panel for building exteriors, comprising:

a rectangular patterned polymer board, the pattern selected from the group consisting of dimples, corrugated, and combinations thereof; and comprising first and second pairs of adjacent edges; and wherein, when installed on a wall, the polymer board;

is free from mortar holes capable of allowing mortar bridging or mortar droppings through the polymer board and toward the interior of the wall; and allows for the free passage of moisture through the pattern, thereby avoiding the retention of moisture; and a rectangular lath panel affixed to the board, the lath panel comprising:

galvanized slit and expanded steel; and first and second pairs of adjacent edges; and wherein:

the lath panel and the polymer board arrangement is selected from the group consisting of the first pair of adjacent edges of the lath panel overhang the first pair of adjacent edges of the polymer board, the second pair of polymer board adjacent edges overhang the second pair of lath adjacent edges, and combinations thereof; and wherein when the lath and patterned polymer board panel is applied over a weather-resistant barrier, the polymer board is in continuous contact with the weather-resistant barrier and the polymer board is sandwiched between the weather-resistant barrier and the lath.

\* \* \* \* \*